United States Patent [19]

Jägers

[11] 4,417,834
[45] Nov. 29, 1983

[54] MACHINE FOR DRILLING A DOUBLE T PROFILE

[75] Inventor: Leopold Jägers, Rudolf-Diesel-Strasse 1, D-5350 Euskirchen, Fed. Rep. of Germany

[73] Assignee: Leopold Jägers, Euskirchen, Fed. Rep. of Germany

[21] Appl. No.: 109,974

[22] Filed: Jan. 7, 1980

[30] Foreign Application Priority Data

Jan. 8, 1979 [DE] Fed. Rep. of Germany ....... 2900469

[51] Int. Cl.³ ............................................. B23B 41/00
[52] U.S. Cl. .................................... 408/16; 33/174 L; 408/111
[58] Field of Search ................ 408/16, 103, 111, 115, 408/39, 1, 3, 42; 33/174 L, 189; 228/105

[56] References Cited

U.S. PATENT DOCUMENTS

| 3,120,135 | 2/1964 | Henderson | 408/16 |
| 3,977,804 | 8/1976 | Kitagawa | 408/16 |
| 4,010,885 | 3/1977 | Keizer et al. | 228/105 X |
| 4,080,740 | 3/1978 | Haley | 33/174 L |

Primary Examiner—Z. R. Bilinsky
Attorney, Agent, or Firm—Kenyon & Kenyon

[57] ABSTRACT

A scale is connected with the vertically movably tracer so as to provide an indication of the surface of the tracer abutting the underside of a stem of a T profile. The scale is adjustable relative to the tracer by an amount equal to one half the stem width and cooperates with an indicator of the center line of the drill of the drilling unit.

3 Claims, 1 Drawing Figure

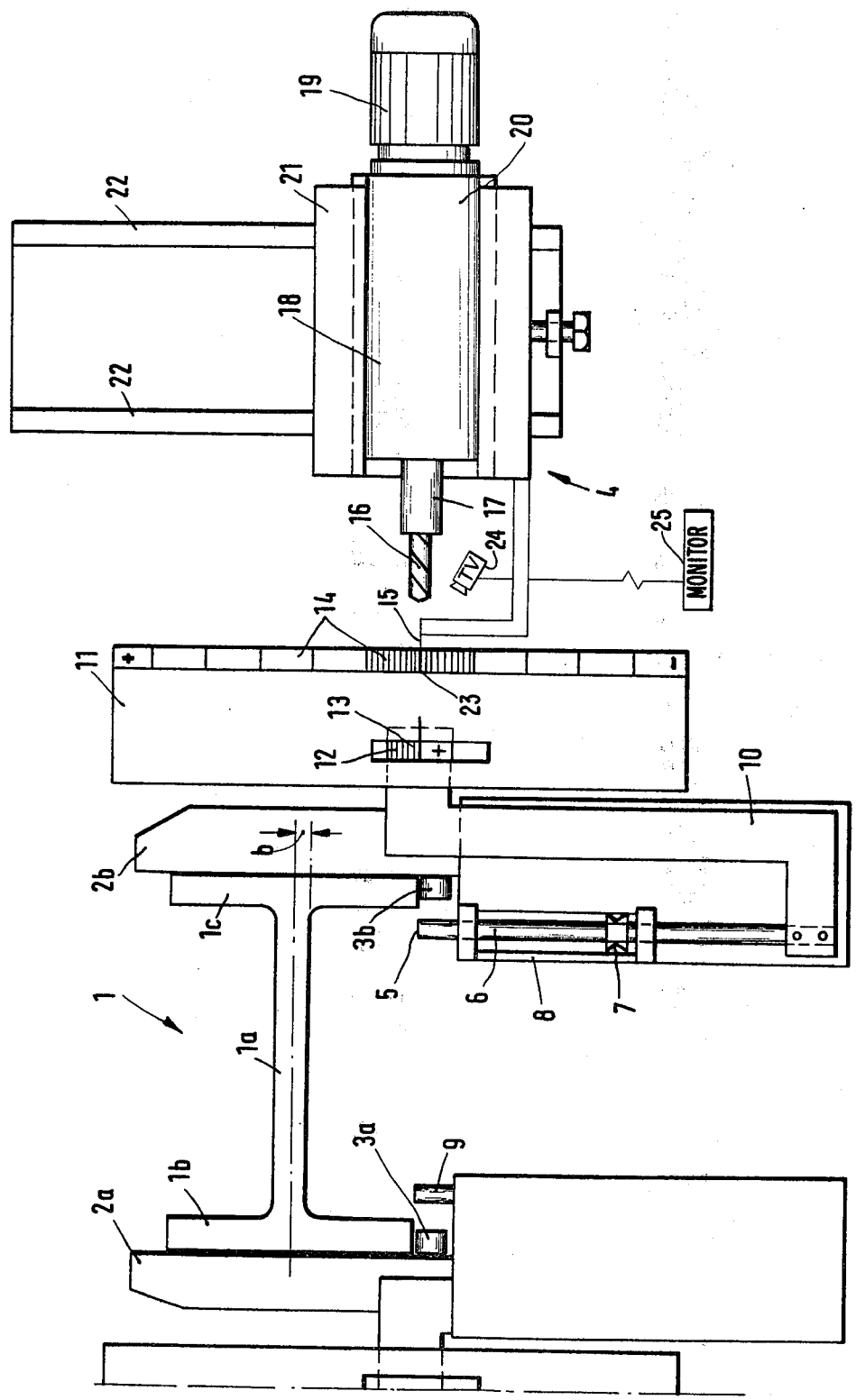

MACHINE FOR DRILLING A DOUBLE T PROFILE

This invention relates to a method of drilling a double T profile and to a drilling machine therefor.

Heretofore, in order to connect steel girders, particularly double T girders, to one another by way of butt straps, it has been known to provide the flanges of these girders with bores which are aligned to the center of the stems of the girders. For this purpose, it has been known to utilize drilling machines for drilling the bores. However, in order to assure that the bores are drilled in the stems, measurements must be taken as to the placement of the drill relative to the girders. Thus, in some cases, use has been made of a measuring tape and a vernier by the operator of the machine. However, this is time-consuming as the operator must go to the machine and leave his working position which is generally a central position.

Drilling machines are also known which have a stem scanning means so that rod-shaped tracers can be run from below into the profile to transfer a scanned measurement electronically to a control panel. However, as the tracer only specifies the underside of the stem, the exact center of the stem must be found by mathematical conversion. Accordingly, it has been proposed that tracers be run into the profile from above and below so that the center between two scanned values gives the center of the horizontal stem of the profile. However, this process is relatively expensive.

Accordingly, it is an object of the invention to provide a process to determine the center of a profile or a profile stem without resorting to mathematical conversions.

It is another object of the invention to provide a simple technique for directly specifying the position of a drilling tool in relation to a profile center.

It is another object of the invention to provide a drilling machine which is capable of accurately drilling bores in double T profiles in a relatively simple manner.

It is another object of the invention to provide a drilling machine which is of simple construction and which does not require excess calculation steps to determine the center of a profile stem.

Briefly, the invention provides a method of drilling a profile, particularly a double T profile, as well as a drilling machine for drilling bores in the profile.

The method comprises the initial step of mounting a double T profile having a stem of a given thickness in a given position adjacent to a drill unit having a drill therein and an indicator positioned to indicate a drilling axis of the drill. In addition, the method includes the steps of moving a tracer perpendicularly of the profile stem to abut the stem, of moving a scale connected to the tracer simultaneously with the tracer and relative to the indicator on the drill unit until the stem is abutted and of adjusting the scale and indicator relative to each other by an amount equal to one half the stem thickness whereby the resulting position of the indicator corresponds to the axis of the stem and aligns the drill axis with the stem axis. Thereafter, the drill unit is moved perpendicularly towards the profile to drill a bore into the stem.

In accordance with the method, the scale which is connected to the tracer has a zero line coincident with the stem-abutting surface of the tracer and the indicator is moved relative to the zero line by the amount above specified. Alternatively, the scale may be moved relative to the tracer by the specified amount whereby the zero line then aligns with the axis of the stem of the profile.

The drilling machine is comprised of a means for mounting a double T profile having a stem of a given thickness thereon, a drill unit having a drill therein and an indicator positioned to indicate a drilling axis of the drill, a tracer mounted for movement perpendicularly of the profile stem to abut the stem and a scale connected to the tracer for moving therewith and being disposed to register with the indicator of the drill unit.

In one embodiment, the scale is adjustable relative to the tracer in order to adjust the scale relative to the indicator on the drill unit.

In another embodiment, an adjustment of the indicator relative to the drill may be used to adjust the indicator relative to the scale.

In still another embodiment, instead of mounting an indicator on the drill unit, a television camera can be directed at the scale to transmit an image thereof and a remote monitor can be connected to the camera to display the transmitted image of the scale. The monitor also has an indicator positioned to indicate a drilling axis of the drill and means are provided for adjusting the indicator relative to the displayed image of the scale on the monitor.

In order to provide for an adjustment of the scale relative to the tracer, an arm can be connected to the tracer while a separate holder which is movably mounted on the arm is connected to the scale. In this case, a second scale is mounted on one of the arm or holder and a second indicator is mounted on the other of the arm or holder. This second indicator is further disposed in register with the second scale to indicate the amount of relative movement between the first scale and the tracer.

In accordance with the method, it is possible to obtain values on the scale in a simple way which relate to the stem center of the profile so that conversion of measured values is unnecessary and the machine operator need not leave a central working position. Further, the method can be performed with slight changes to existing machines as the method requires little construction expense. Moreover, measurement and transfer errors are safely avoided.

These and other objects and advantages and the invention will become more apparent from the following detailed description taken in conjunction with the drawing wherein:

The drawing schematically illustrates a drilling machine constructed in accordance with the invention.

Referring to the drawing, the drilling machine is constructed so as to receive a double T profile 1 which lies thereon with a horizontal stem 1a of a given thickness and a pair of vertical flanges 1b, 1c. As indicated, the machine includes means for mounting the profile 1 thereon. This means is in the form of a pair of vertical clamping jaws 2a, 2b and rolls 3a, 3b. As indicated, the rolls 3a, 3b support the undersides of the flanges 1b, 1c so that the profile 1 can be run in the longitudinal direction when the clamping jaws 2a, 2b are released.

In addition, the machine has a drill unit 4 mounted astride the position of the profile 1 in order to drill bores into the stem 1a. This drill unit 4 includes a twist drill 16 which is held by a drilling spindle 17 which, in turn, is actuated by a gear 18 connected to a motor 19. The gear 18 and motor 19 are held by a cradle 20 which, in turn, is reciprocally movable within a carriage 21 axially of the axis of the drill 16. The carriage 21 is, in turn, mounted on rails 22 so as to be movable vertically via suitable rolls (not shown). Suitable means are also provided for fixing the carriage 21 in place on the rails 22. The rails 22 can be secured to the frame (not shown) of the drilling machine or to a further horizontally movable carriage of the drilling machine for movement along the length of the profile 1.

In order to specify the point at which a bore is to be drilled in the profile with the drilling unit 4, a rod-shaped tracer (probe) 5 is disposed below the profile 1 so as to move vertically and longitudinally relative to the profile 1. The tracer 5 is formed by a vertical piston rod 6 which has a free end surface for movement into abuttment with the stem 1a as well as a cylinder 8 having the piston rod 6 slidably mounted therein. As shown, the piston rod 6 carries a piston 7 within the cylinder 8 which can be actuated hydraulically. The tracer 5 is situated in the proximity of the clamping jaw 2b so that the tracer 5 scans the underside of the stem 1a in the proximity of the flange 1c.

A similar rod-shaped tracer 9 may also be situated adjacent the other jaw 2a in parallel relation with the tracer 5. This second tracer 9 cooperates with a second drilling unit (not shown) the drill of which is also arranged horizontally and perpendicular to the longitudinal axis of the profile 1. Thus, two drilling units can work on the profile 1 at the same time.

The profile 1 may also have a stem which is disposed obliquely in relation to the flanges. Such stems can also be measured and indicated with the arrangement of the two tracers 5,9 on the two opposing sides of the stem 1a.

As shown, an arm 10 is connected to the piston rod 6 of the tracer 5 on the underside. This arm 10 carries a holder 11 at the upper end such that the arm 10 and holder 11 are movable simultaneously with the piston rod 6. The holder 11 is also adjustable in relation to the arm 10, or vice versa, in the direction of movement of the holder 11. To this end, a scale 12 is attached to the holder 11 while an indicator 13 is attached to the arm 10 to lie in register with the scale 12. This permits the measurement of an adjustment between the arm 10 and holder 11 to be read off the scale 12.

The holder 11 also carries a vertical scale 14 on the side facing the drilling unit 4. This scale 14 is in register with an indicator 15 which is carried on the drilling unit 4. The indicator 15 is positioned to indicate the drilling axis of the drill 16 such that the axis of the drill 16 is flush with a zero line 23 of the indicator 15. Thus, any movement of the vertically movable drill unit 4 relative to the scale 14 can be read off the scale 14 directly.

In use, before a bore is drilled in the flange 1c by the drill unit 4, the tracer 5 is run from below into the profile 1 until the free end surface of the tracer 5 abuts the underside of the stem 1a. During this time, the arm 10 and scale holder 11 are also shifted vertically upwards by the tracer 5. Thereafter, the scale holder 11 is further shifted vertically upwards in relation to the arm 10 by a distance b corresponding to one half the width or thickness of the stem 1a. In order to adjust to the distance b, the scale 12 is provided. This enables the center or zero line 23 of the scale 14 to be coplanar or flush with the center line of the stem 1a so that the exact position of the drill unit 4 is specified relative to the stem center on the scale 14 via the indicator 15.

It is to be noted that the zero line 23 of the scale 14 and the indicator 15 need not be flush with the axis of the stem 1a when in an aligned position with the stem axis. Instead, the indicator 15 may be disposed above or below the zero line 23 of the scale 14 so long at they are displaced at the same distance in both cases.

Alternatively, instead of adjusting the holder 11 relative to the arm 10, the arm 10 can also be adjusted downwards in relation to the holder 11 by the distance b so that when the tracer 5 abuts the underside of the stem 1a, the zero line of the scale 14 is in alignment with the axis of the stem 1a.

In a further embodiment, the arm 10 can also be fixedly attached to the holder 11 and the indicator 15 can be adjusted downwards in relation to the drill unit 4 by the distance b or the drill unit 4 can be adjusted upwards in relation to the indicator 15 by the distance b so that the scale 14 and indicator 15 indicate the exact position of the drill 16 in relation to the stem axis. A similar scale to the scale 12 can be provided for this adjustment of the drilling unit 4 and indicator 15 in relation to one another so that the exact measurement of an adjustment can be set corresponding to one half the stem width.

So that the scale 14 does not have to be read directly at the drilling machine, a television camera 24 can be directed at the scale 14 to transmit an image thereof in the area of the zero line 23 to a remote monitor 25 connected to the camera 24 in a suitable manner in order to display the transmitted image of the scale 14. Such a monitor may be disposed at a central operating area such as a console or booth. In this way, the camera can be used to display both the scale 14 and indicator 15 or the camera can be mounted to run with the drill unit 4 so as to form the indicator. Likewise, the monitor may also be provided with an indicator which is positioned to indicate the drilling axis of the drill. In this case, it is possible to set at the stem axis by adjusting the camera vertically downwards in relation to the scale 14 by one half the stem width. Alternatively, this can also be achieved by a means for adjusting the indicator relative to the displayed image of the scale 14 on the monitor. For example, the indicator (or indicator line) may be mechanically or electronically adjusted vertically by a measurement corresponding to one half the stem width. Since the monitor could show the scale 14 in an enlarged form, for example at a scale of from 1:4 to 1:6, a particularly exact setting is possible by adjustment at the monitor.

The invention thus provides a process for easily measuring a profile, particularly a double T profile, which is being worked in a machine such as a drilling machine via at least one drill unit (tool) which is mobile transversely to the longitudinal axis of the profile.

What is claimed is:

1. A drilling machine comprising
   means for mounting a double T profile having a stem of a given thickness along a longitudinal axis thereon;
   a drill unit having a drill therein and an indicator positioned to indicate a drilling axis of said drill;
   a tracer mounted for movement prependicularly of the profile stem to abut the stem;
   a scale connected to said tracer for moving therewith, said scale having a center line to establish the position of said stem axis and being disposed to register with said stem axis and said indicator of said drill unit and being adjustable relative to said tracer to adjust said scale relative to said indicator;
   an arm connected to said tracer;

a holder connected to said scale and movably mounted on said arm;

a second scale mounted on one of said arm and said holder; and a second indicator mounted on the other of said arm and said holder, said second indicator being disposed in register with said second scale to indicate an amount of relative movement between said first scale and said tracer.

2. A drilling machine comprising means for mounting a double T profile having a stem of a given thickness thereon;

a drill unit having a drill therein and an indicator positioned to indicate a drilling axis of said drill, said indicator being adjustable relative to said drilling axis of said drill;

a tracer mounted for movement perpendicularly of the profile stem to abut the stem;

a scale connected to said tracer for moving therewith, said scale being disposed to register with said indicator of said drill unit whereby an adjustment of said indicator relative to said drill adjusts said indicator relative to said scale;

an arm connected to said tracer;

a holder connected to said scale and movably mounted on said arm;

a second scale mounted on one of said arm and said holder; and a second indicator mounted on the other of said arm and said holder, said second indicator being disposed in register with said second scale to indicate an amount of relative movement between said drill and said first indicator.

3. A drilling machine comprising means for mounting a profile having a stem along a longitudinal axis;

a tracer mounted for movement perpendicularly of the profile stem for abutting the stem;

a scale connected to said tracer for movement therewith and having a center line parallel with a center line of the profile stem to establish the position of said stem axis;

a drill unit movably transversely of said longitudinal axis and including a drill for drilling a bore in the profile and an indicator positioned on said drill unit to indicate a drilling axis of said drill, said indicator being disposed in register with said center line of said scale to establish the position of said drill relative to said stem axis;

an arm connected to said tracer for moving therewith; and a scale holder adjustably carried on said arm and having said scale attached thereto.

* * * * *